(No Model.) 2 Sheets—Sheet 1.
F. KAUFMAN.
APPARATUS FOR MAKING WIRE AND PICKET FENCES.
No. 361,362. Patented Apr. 19, 1887.
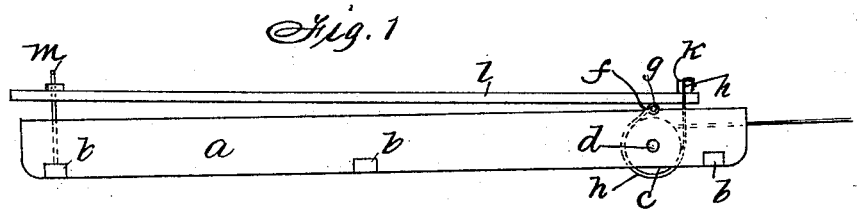
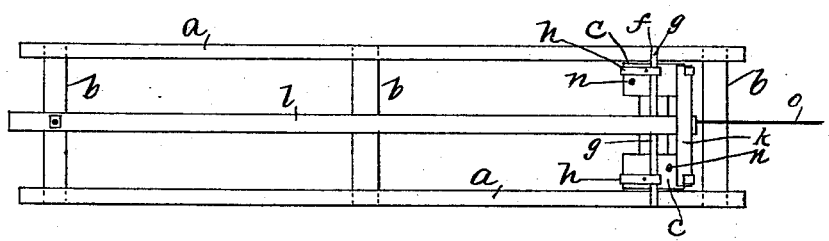
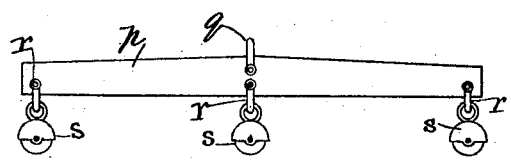
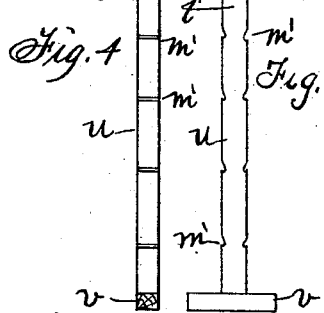
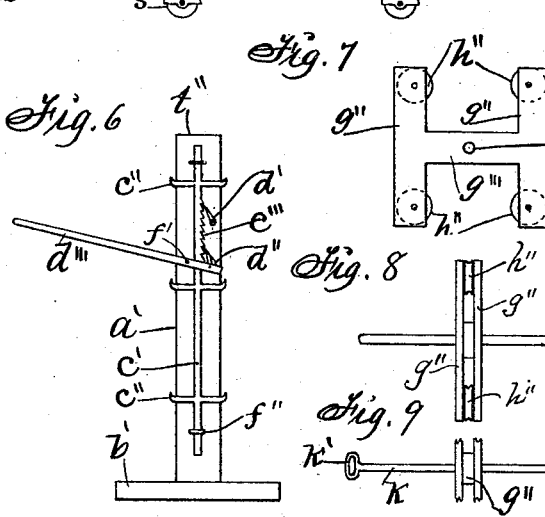
Witnesses:
R. H. Orwig.
C. S. Hudgens.
Inventor:
Frank Kaufman,
By Thomas G. Orwig, Atty.

(No Model.) 2 Sheets—Sheet 2.
F. KAUFMAN.
APPARATUS FOR MAKING WIRE AND PICKET FENCES.
No. 361,362. Patented Apr. 19, 1887.
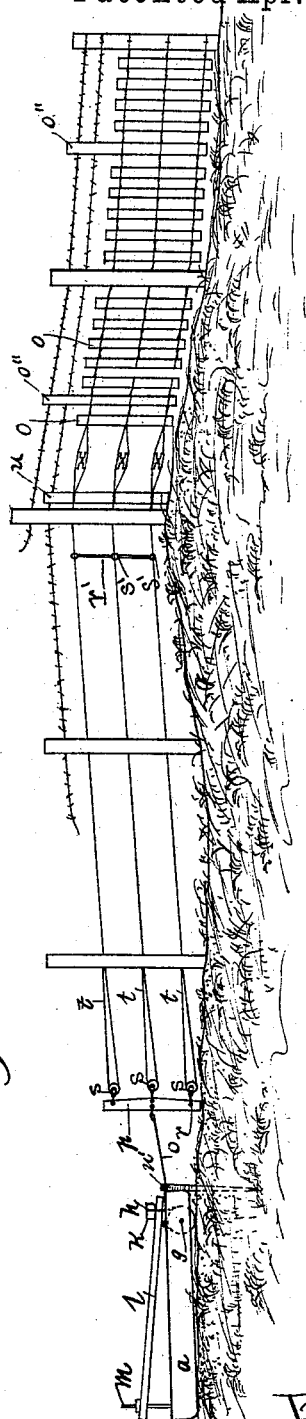
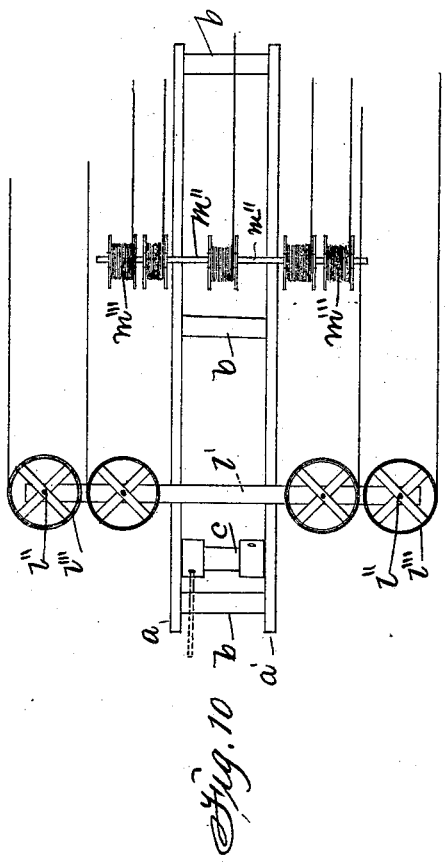
Witnesses:
R. H. Orwig.
C. W. Hudgens.
Inventor:
Frank Kaufman,
By Thomas G. Orwig, Att'y.

UNITED STATES PATENT OFFICE.

FRANK KAUFMAN, OF INDIANOLA, IOWA.

APPARATUS FOR MAKING WIRE AND PICKET FENCES.

SPECIFICATION forming part of Letters Patent No. 361,382, dated April 19, 1887.

Application filed August 24, 1886. Serial No. 211,717. (No model.)

*To all whom it may concern:*

Be it known that I, FRANK KAUFMAN, a citizen of the United States, residing at Indianola, in the county of Warren and State of Iowa, have invented a new and useful Apparatus for Making a Combined Wire and Picket Fence, of which the following is a specification.

The object of my invention is to provide an improved apparatus for making picket fences by the use of a tension device constructed with a roller for carrying a rope or chain, which roller is provided with a frictional brake or tension device for giving a yielding tension to the wires while drawn to the posts and while the wire is being twisted about the pickets. To the rope or chain of the roller is attached an equalizing-evener, to which swivel-pulleys are attached carrying the wires. Twisters which are made in the form of a rectangular frame with pulleys and a frame for operating, are held between the two strands of wire and used for twisting the wires as the pickets are successively placed in position.

My apparatus is illustrated in the accompanying drawings, in which—

Figure 1 is a side, and Fig. 2 a top, view of the stretcher or tension device; Fig. 3, a view of the evener with pulleys; Figs. 4 and 5, edge and side views of the gage for holding wires in proper position for twisting; Fig. 6, a side view of a jack for raising the wires when drawn over elevations; Figs. 7 and 8, top and edge views of the twisters; Fig. 9, an edge view of the bottom twister with eye in lever for operating with the foot; Fig. 10, a top view of the tension device with bars attached for carrying and unwinding wire. Fig. 11 is a view of the complete apparatus in operation.

The tension device shown in Figs. 1, 2, and 11 is a frame composed of the two planks $a$, placed on their edges and held in position by the cross-bars $b$. The lower corners of the planks $a$ are rounded off in the form of runners, and near their front end is a roller or spool, $c$, with bearings $d$ in the planks $a$ sufficiently near their lower edge to permit the roller $c$ to project below and rest on the ground. Directly above the bearings $d$, and on the upper edge of the planks $a$, are open bearings $f$, for supporting a bar, $g$, to which two iron straps, $h$, are fastened just within the planks $a$, and which pass around the ends of the spool $c$ and are attached at their other ends to a bar, $k$, at a short distance above the planks $a$. Beneath the center of the bar $k$ rests the end of a lever, $l$, having as its fulcrum the bar $g$, and extending rearward to any desirable distance for procuring leverage. From one of the cross-bars $b$ a long bolt, $m$, extends upward through a slotted hole in or near the end of the lever $l$, which bolt by means of a burr will hold the rear end of the lever $l$ down to any position which may be desired for gripping the spool $c$ tightly by the straps $h$.

The spool $c$ is provided with holes $n$ near its ends for admitting hand-bars for the purpose of turning the spool and stretching the wire. The central portion of the spool $c$, upon which the wire or chain $o$ is wound, which leads to the evener $p$, is made with a smaller diameter than at its ends, for the purpose of gaining greater leverage.

The evener $p$ (shown in Fig. 3) is supplied with the clevis $q$ on one side, to which the chain $o$ is attached. The other side is supplied with two or three or any number of clevises, $r$, to which swivel-pulleys $s$ are attached, through which the wires $t$ pass, as shown in Fig. 11. The wires $t$ being double stranded, the object of these pulleys is to equalize the tension on both strands, thus avoiding the possibility of one strand receiving a more severe strain than the other and breaking. The use of swivel-pulleys permits the wires to rotate backward and forward in the process of twisting, and accommodate themselves to the relative position of the strands.

Figs. 4 and 5 are views of a gage, $t'$, constructed of posts $u$, with feet $v$ and notches $m$ at regular intervals in the posts $u$, for holding the wires separated to their proper relative position.

Fig. 6 shows a jack, $t''$, for raising the wires where they pass over an elevation and are drawn to the ground. It is constructed of an upright post, $a'$, and foot $b'$, with a rod, $c'$, having the integral arms $c''$, at any desired distance from each other, for holding the wires, and notches or teeth $c'''$ on one side for receiving a pawl, $d'$, on the post $a'$, and a pawl, $d''$, on the end of the lever $d'''$, attached to the post $a'$ at the pivot $f'$. The rod $c'$ is fastened to the post a' by the staples f'', which permit the rod c' to have a free upward-and-downward movement when operated by the lever d'''.

Figs. 7, 8, and 9 are views of a weaver, g', which is placed between the two strands of the wire for the double purpose of separating them to admit the picket and for twisting the wires after the picket has been inserted. They are constructed in a rectangular shape of two double iron strips, g'', held parallel by a cross-bar, g''', at their centers. Through the center is a lever, h', for turning the entire frame and twisting the wires which pass over the grooved pulleys h'', set between the bars g' and near their ends. These pulleys are so set that the wires will pass between the outside edges of the strips or bars g', thus retaining the wires upon the pulleys and preventing the entire frame from dropping out of the wires. The object of these pulleys is to allow the weavers to pass along between the wires with readiness in moving them to a new position for inserting another picket. Fig. 9, a broken view of the twister for the bottom wire, differs from the others in having the eyes k' in the ends of the lever k, to be operated by a hook strapped to the foot of the operator.

Fig. 10 is a top view of the tension device, showing the attachment of the bar l', with pins l'', for carrying the reels l''', on which the coils of wire m' are carried while unwinding. m'' is a round bar on which spools of barbed wire m''' are carried for unwinding when building barbed fence and using the capstan in the capacity of a stretcher. For laying or drawing the wires, they are thus loaded on the capstan and horses hitched to the front end and the whole drawn as a sled, with the roller c acting as a wheel for supporting and carrying the front end. When the wire has run out, the tension device is turned about and placed in position, as shown in Fig. 11, and secured by stakes n'. The straps h, bars g and k, lever l, chain o, and evener p are put in position, and the apparatus is ready for stretching the wire.

By the frictional tension device of the described apparatus I secure the advantage of a constant and uniform tension on the wires as the spool c yields to the weight of the fence as it gradually grows heavier, thus retaining the same stress upon the wires between the pickets and the evener p, thereby insuring the close and firm twisting of the pickets o'. In stretching barbed wire over uneven or hilly ground a great advantage is gained by a yielding tension in raising or lowering the wires where they pass over an elevation or a hollow.

Fig. 11 shows the above-described complete apparatus as operated in making fences. Fences may be constructed by this apparatus of short pickets for a close bottom, with longer pickets o'', projecting at intervals for the support of barbed wires, as illustrated.

In Fig. 11, r' is a bar with eyes s', through which the wires pass for holding them at regular intervals from each other, and is slid along the wires ahead of the twisters. The wires are passed through the eyes s' of the bar r' before they are attached to the first post.

I claim as my invention—

1. The combination of a tension device having planks a, bars b, roller c, straps h, bars g and k, lever l, bolt m, and rope o with evener p, having clevises q and r and pulleys s, and with gages t' or jack t'', divider r', and twisters g', having bars g'' and g''', levers h', and swivel-pulleys h'', substantially as set forth, for the purposes stated.

2. The combination of the planks a, bars b, spool c, straps h, bars g and k, lever l, bolt m, rope or chain o with evener p, having clevises q and r and swivel-pulleys s, substantially as shown and described.

3. The combination of the evener p, with clevises q and r and one or more swivel-pulleys, s, with gages t', jack t'', divider r', and twisters g', substantially as and for the purposes stated.

4. The combination of the planks a, bar b, spool c, straps h, bars g and k, the lever l, bolt m, and rope or chain o with clevis q, evener p, clevises r, and pulleys s, to operate substantially as shown and specified.

5. The combination of the planks a, roller c, bars b, l', and m'', the pins l'', reels l''', and spools m''', substantially as and for the purposes stated.

6. The combination of strips g'' and g''', lever h', and pulleys h'', substantially as and for the purposes stated.

7. The combination of the post a', foot b', rod c', with arm c'' and teeth c''', the pawls d' and d'', lever d''', pivot f', and staples f'', substantially as and for the purposes stated.

FRANK KAUFMAN.

Witnesses:
JOHN M. HAWORTH,
W. H. H. HURSH.